United States Patent
Li et al.

(10) Patent No.: US 10,016,861 B2
(45) Date of Patent: Jul. 10, 2018

(54) APPARATUS OF ALIGNING AND ASSEMBLING

(71) Applicants: BOE TECHNOLOGY GROUP CO., LTD., Beijing (CN); BOE (HEBEI) MOBILE DISPLAY TECHNOLOGY CO., LTD., Hebei (CN)

(72) Inventors: Peng Li, Beijing (CN); Hongqiang Fan, Beijing (CN); Yanhui Song, Beijing (CN); Hongqian Cai, Beijing (CN); Nan Ma, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

( * ) Notice: Subject to any disclaimer, the term of this patent is extended or adjusted under 35 U.S.C. 154(b) by 376 days.

(21) Appl. No.: 14/801,192

(22) Filed: Jul. 16, 2015

(65) Prior Publication Data

US 2016/0265892 A1   Sep. 15, 2016

(30) Foreign Application Priority Data

Mar. 12, 2015 (CN) .......................... 2015 1 0110088

(51) Int. Cl.
*B23P 19/04* (2006.01)
*B23P 19/10* (2006.01)
*G02F 1/13* (2006.01)

(52) U.S. Cl.
CPC ............... *B23P 19/04* (2013.01); *B23P 19/10* (2013.01); *G02F 1/1303* (2013.01); *B32B 2457/202* (2013.01)

(58) Field of Classification Search
CPC .......... B32B 37/0046; B32B 2457/202; B32B 37/1009; B32B 37/1018; B32B 37/18;
(Continued)

(56) References Cited

U.S. PATENT DOCUMENTS

2008/0257473 A1* 10/2008 Tremel ................ B32B 37/0046
156/60
2014/0061989 A1* 3/2014 Zhang ................... G02F 1/1303
269/37

FOREIGN PATENT DOCUMENTS

CN         102855856 A       1/2013
CN         103018938 A       4/2013
(Continued)

OTHER PUBLICATIONS

Translation of CN204188922U, generated Sep. 8, 2017.*
First Chinese Office Action dated Feb. 23, 2017; Appln. No. 201510110088.7.

*Primary Examiner* — Matthew P Travers
(74) *Attorney, Agent, or Firm* — Ladas & Parry LLP

(57) ABSTRACT

An apparatus of aligning and assembling, comprising a rotatable platform, an adjustment platform and a turnover unit; wherein the rotatable platform is connected to the turnover unit, which is disposed at one side of the adjustment platform and configured to drive the rotatable platform to turn over to be positioned above the adjustment platform and be opposite to the adjustment platform; and the rotatable platform and the adjustment platform are provided with a first holding unit and a second holding unit, respectively, which are configured to hold objects to be aligned and assembled with each other, respectively.

10 Claims, 2 Drawing Sheets

(58) Field of Classification Search
CPC .......... B32B 37/187; B32B 38/1833–38/1841;
B32B 38/1858; G02F 1/1303; Y10T
29/5313; Y10T 29/53191; Y10T
29/53257; Y10T 29/53261; Y10T
29/53678; Y10T 29/53909; Y10T
29/53943; Y10T 29/53978; Y10T
29/49895; Y10T 29/49899; B23P
2700/12; B23P 11/00; B23P 19/04; B23P
19/10; B30B 9/00; B30B 12/00; B30B
15/061; B30B 15/281
See application file for complete search history.

(56) References Cited

FOREIGN PATENT DOCUMENTS

| | | |
|---|---|---|
| CN | 103149718 A | 6/2013 |
| CN | 103680449 A | 3/2014 |
| CN | 203643721 U | 6/2014 |
| CN | 204143108 U | 2/2015 |
| CN | 204188922 U | 3/2015 |
| CN | 204389838 U | 6/2015 |

* cited by examiner

APPARATUS OF ALIGNING AND ASSEMBLING

TECHNICAL FIELD

Embodiments of the present invention relate to an apparatus of aligning and assembling.

BACKGROUND

At present, Liquid Crystal Display (LCD) has been widely used in product manufacture and daily life for technical superiority thereof. In an assembling process of Liquid Crystal Module (LCM), it's required to align and assemble a LCD with a Back Light Unit (BLU) or with a Cover Glass (CG). The well-known technologies usually complete such assembling process by manual operation. However, with increased requirements on thinned and refined products, such kind of assembling process by manual operation can no longer meet manufacture demands because it's not only complicated in operation but also has high possibility of misalignment in assembling the BLU/CG with the LCD, which may lead to poor product yield, low production efficiency and high breakage ratio; moreover, the assembling process by manual operation may also involve negative influence to the product yield due to different degrees of proficiency of operators.

Thus it needs an apparatus of aligning and assembling which can achieve an accurate alignment during the assembling process of the LCM so as to improve the product yield and the production efficiency, and reduce the breakage ratio.

SUMMARY

At least one embodiment of the present invention provides an apparatus of aligning and assembling, comprising: a rotatable platform, an adjustment platform and a turnover unit; wherein the rotatable platform is connected to the controlling unit which is disposed at a side of the adjustment platform and configured to allow the rotatable platform to turn over to be positioned above the adjustment platform and be opposite to the adjustment platform; the rotatable platform and the adjustment platform are provided with a first holding unit and a second holding unit, respectively, which are configured to hold objects to be aligned and assembled with each other, respectively.

BRIEF DESCRIPTION OF THE DRAWINGS

Embodiments of the present invention will be described in more details below with reference to the accompanying drawings to enable those skilled in the art to understand the present invention more clearly, wherein.

REFERENCE NUMERALS

1: rotatable platform; 2: adjustment platform; 3: turnover unit; 5: sliding chute; 6: alignment stopper; 7: turnover limiting post; 8: turnover handle; 9: base; 10: vacuum regulating valve; 11: press plate; 12: a first base station; 13: adjustment button; 14: down-press limiting post; 15: elastic post; 16: power switch; 17: grip; 21: a first adjustment micrometer; 22: a second adjustment micrometer; 23: a third adjustment micrometer; 24: a second base station; 31: turnover frame; 32: turnover shaft; 41: Vacuum adsorption platform.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly. The applicant realized that a light transmittance of LC panel in the array substrate shown in FIG. 1 and FIG. 2 is not quite large due to the same voltage of common electrodes in the array substrate.

Figure 1:
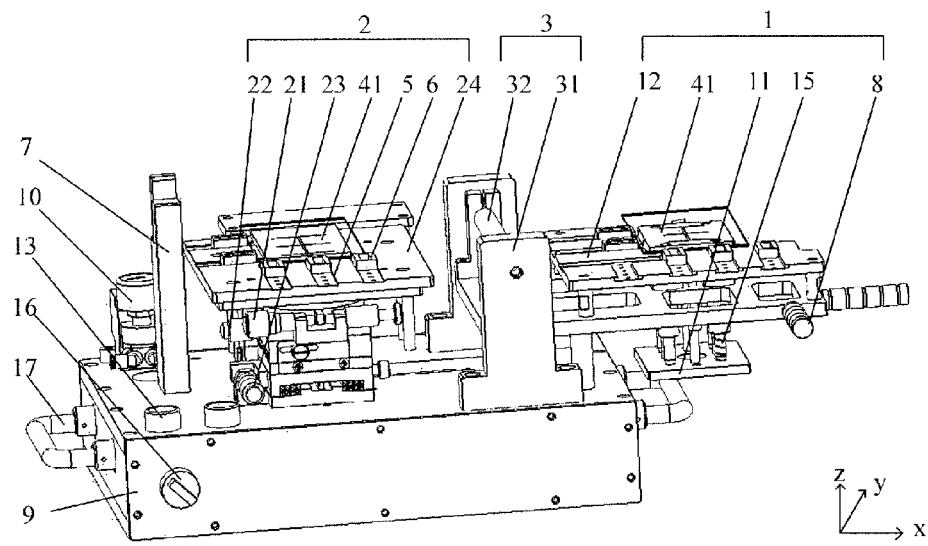
FIG. 1 is an elevation view illustrating an apparatus of aligning and assembling according to an embodiment of the present invention.
Figure 2:
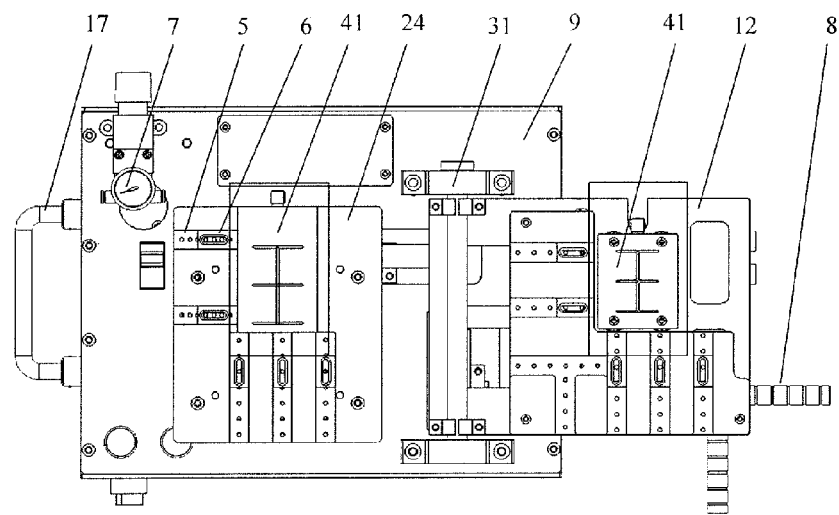
FIG. 2 is a top view illustrating the apparatus of aligning and assembling according to the embodiment of the present invention.
Figure 3:
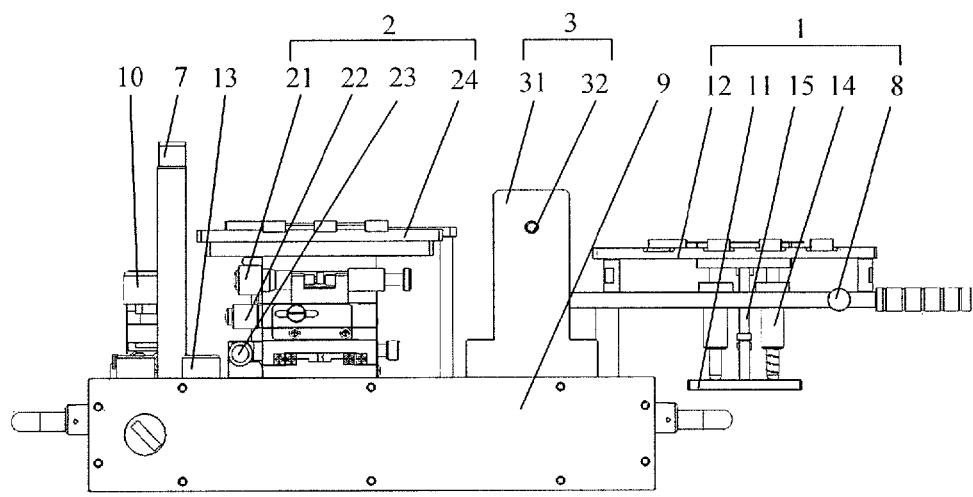
FIG. 3 is a side view illustrating the apparatus of aligning and assembling according to the embodiment of the present invention.

In conjunction with FIG. 1, FIG. 2 and FIG. 3, as seen, embodiments of the present invention provide an apparatus of aligning and assembling, comprising a rotatable platform 1, an adjustment platform 2 and a turnover unit 3; wherein the rotatable platform 1 is connected to the turnover unit 3 which is disposed at one side of the adjustment platform 2 and configured to allow the rotatable platform 1 to turn over to be positioned above the adjustment platform 2 such that the rotatable platform 1 and the adjustment platform 2 are in opposite with each other, a first holding unit and a second holding unit are disposed on the rotatable platform 1 and the adjustment platform 2, respectively, and are configured to hold objects to be aligned and assembled with each other, respectively. For example, the first holding unit disposed on the rotatable platform 1 is configured to hold a CCD while the second holding unit disposed on the adjustment platform 2 is configured to hold a BLU/CG. Upon the rotatable platform 1 is turned over, the LCD and the BLU/CG can be assembled together with high accuracy.

The apparatus of aligning and assembling according to embodiments of the present invention intends to replace the well-known assembling process by manual operation; wherein a rotatable platform 1 is rotatably disposed at one side of an adjustment platform 2, holding units are disposed on the rotatable platform 1 and the adjustment platform 2 respectively and configured to hold a BLU/CG and a LCD respectively so as to align and assemble the BLU/CG with the LCD more accurately; in this way, it can effectively improve the product yield and production efficiency, and reduce the breakage ratio; moreover, it allows an adjusting and inspecting process with simple operation and no consumable material, thus facilitates the maintenance.

In an example, the rotatable platform 1 comprises an elastic down-press unit and a first base station 12 configured to carry the first holding unit; the elastic down-press unit is disposed below the first base station 12 in such a manner that it has one end penetrating through the first base station 12 to be connected to the first holding unit; upon the rotatable platform 1 is turned over, the first holding unit is driven to move upwards and downwards by the elastic down-press unit, so as to facilitate the adjusting and inspecting process for alignment.

In an example, the elastic down-press unit comprises a press plate 11, an elastic post 15 and a down-press limiting post 14; wherein the press plate 11 is disposed below the first base station 12; the elastic post 15 has one end connected to the press plate 11 and the other end penetrating through the first base station 12 to be connected to the first holding unit; the press plate 11, when applied with a downward pressure, can drive the first holding unit to move upwards and downwards by the elastic post 15; furthermore, the down-press limiting post 14 is disposed between the press plate 11 and the first holding unit; the down-press limiting post 14 is also disposed at the first base station 12 by penetrating there-through and configured to control a downward distance under pressure so as to avoid any defects in products resulted by overpressure.

As above, the apparatus of aligning and assembling as provided by embodiments of the present invention utilizes an elastic down-press unit and a first holding unit which are cooperated with each other, so as to allow convenient operation as well as accurate alignment and assembly.

Of course, the number of the elastic post 15 as utilized is not limited herein but can be arranged flexibly according to practical demands, for example, 4.

In an example, the adjustment platform 2 comprises a differential adjustment unit and a second base station 24 configured to carry the second holding unit; the differential adjustment unit is disposed below the second base station 24 and configured to adjust a location of the second base station 24 so as to facilitate the adjusting and inspecting process.

In an example, the differential adjustment unit comprises a first adjustment micrometer 21, a second adjustment micrometer 22 and a third adjustment micrometer 23 which are disposed below the second base station 24 in sequence; the second adjustment micrometer 22 is configured to drive the second base station 24 to move along a direction of X-axis (i.e., a lateral direction); the third adjustment micrometer 23 is configured to drive the second base station 24 to move along a direction of Y-axis (i.e., a longitudinal direction); the first adjustment micrometer 21 is configured to drive the second base station 24 to move along a circumferential direction of Z-axis, that is, to move with a deflection in a plane where the X-axis and the Y-axis are located, so as to perform an alpha adjustment.

For example, the above-mentioned three adjustment micrometers each can have a structure including a knob and a thimble cooperating with each other, in which the knob is rotated to drive the thimble to withdraw along an axial direction thereof so that an adjustment distance can be read; in this way, a fine adjustment of the location of the adjustment platform 2 is achieved. In an example, the second adjustment micrometer 22 is disposed to be perpendicular to the third adjustment micrometer 23 while the first adjustment micrometer 21 is configured to be deflectable along the circumferential direction of Z-axis by means of a sliding block and a sliding rail, so as to finally achieve the alpha adjustment. Of course, the differential adjustment unit is not limited to the structures described herein but can be implemented with plenty of other forms, for example, it can have a structure including a sliding rail and an adjustment plate which are cooperating with each other.

In an example, each of the second base station 24 and the first base station 12 is provided with a sliding chute 5 and an alignment stopper 6; the alignment stopper 6 is movably disposed on the sliding chute 5 and connected to a corresponding holding unit (i.e., the alignment stopper 6 of the first base station 12 is connected to the first holding unit, and the alignment stopper 6 of the second base station 24 is connected to the second holding unit). For example, it can provide 5 or more sliding chutes which are respectively disposed on the second base station 24 and the first base station 12 in a staggered manner, the alignment stopper 6 is movable along a length direction of the sliding chute 5. When used for limiting, the alignment stopper 6 is connected at one side of the respective holding unit, and can also be fixed to the sliding chute 5 through bolts or pins.

In an example, one side of the second base station 24 is provided with a turnover limiting post 7 configured to limit a location of the rotatable platform 1; the rotatable platform 1, upon turning over, is connected to the turnover limiting post 7, so that a location of the rotatable platform 1 is controllable. In order for convenience of turnover operation, for example, the first base station 12 is further provided with at least one turnover handle 8. For example, it can provide 2 turnover handles 8 which are disposed vertically, respectively, so as to facilitate lifting.

In an example, the turnover unit 3 comprises a turnover frame 31 disposed at one side of the adjustment platform 2, and a top of the turnover frame 31 is provided with a turnover shaft 32 rotatable connected at one side of the rotatable platform 1, so that the rotatable platform 1 is rotatable along a circumferential direction of the turnover shaft 32. For example, one side of the first base station 12 is provided with a receptacle, through which the first base station 12 is rotatable connected to the turnover shaft 32, so that the first base station 12 is rotatable along the circumferential direction of the turnover shaft 32 to be turned over and positioned above the second base station 24.

In an example, the above-mentioned first holding unit and second holding unit have a same structure comprising a vacuum adsorption platform 41 and a vacuum pipe connected to the vacuum adsorption platform 41; the vacuum adsorption platform 41 is disposed on both of the adjustment platform 2 and the rotatable platform 1, and is vaccumized by means of the vacuum pipe. In an example, the vacuum pipe is further provided with a vacuum regulating valve 10 which is electrically connected to an adjustment button 13 and a power switch 16. The power switch 16 is configured to power the holding unit; upon powered, the vacuum regulating valve 10 is controlled by the adjustment button 13 so as to control the vacuum adsorption platform 41.

In an example, for convenience, it can provide 2 adjustment buttons 13, one of which is configured to control the first holding unit disposed on the rotatable platform 1, and the other one is configured to control the second holding unit disposed on the adjustment platform 2.

In an example, the apparatus of aligning and assembling further comprises a base 9 which is configured to carry both the adjustment platform 2 and the turnover unit 3. In an example, handles 17 are disposed at both sides of the base 9 for convenience of moving.

The apparatus of aligning and assembling as provided by embodiments of the present invention is simple in operation and requires no consumable material such as film tearing tapes for running, thus considerably saves the running cost. When used, the BLU/CG and the LCD are placed on the adjustment platform 2 and the rotatable platform 1 respectively in advance with no bonding there-between according to standard requirements at locations pre-adjusted by means of the alignment stoppers; then the rotatable platform 1 is turned over to be opposite to the adjustment platform 2 and held by the second holding unit on the adjustment platform 2; at this time, an adjusting and inspecting process is repeated by adjusting the respective alignment stoppers, and a differential adjustment unit is utilized for further location adjustment in case of any abnormal occurrence. The apparatus of aligning and assembling, when used in assembling the LCM, achieves accurate aligning and assembling of the BLU/CG and the LCD by combining a turnover-based alignment with a sliding-chute-based alignment, and by combining vacuum adsorption with elastic down-press, so as to effectively improve the product yield and production efficiency, and reduce the breakage ratio; moreover, the adjusting and inspecting process is performed without any consumable material; thereby simplifying the operation and facilitating the maintenance.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201510110088.7 titled "apparatus of aligning and assembling" filed on Mar. 12, 2015, which is incorporated herein by reference in its entirely.

What is claimed is:

1. An apparatus of aligning and assembling, comprising a rotatable platform, an adjustment platform and a turnover unit; wherein
    the rotatable platform is connected to the turnover unit, which is disposed at one side of the adjustment platform and configured to allow the rotatable platform to turn over to be positioned above the adjustment platform and be opposite to the adjustment platform; and
    the rotatable platform and the adjustment platform are provided with a first holding unit and a second holding unit respectively, the first holding unit and the second holding unit are configured to hold objects which are to be aligned and assembled with each other, respectively, wherein
    the rotatable platform comprises an elastic down-press unit and a first base station configured to carry the first holding unit; the elastic down-press unit comprises a press plate, an elastic post and a down-press limiting post; the press plate is disposed below the first base station, the elastic post has one end connected to the press plate and the other end penetrating through the first base station to be connected to the first holding unit; and the down-press limiting post is disposed between the press plate and the first holding unit.

2. The apparatus of aligning and assembling of claim 1, wherein the adjustment platform comprises a differential adjustment unit and a second base station configured to carry the second holding unit; wherein
    the differential adjustment unit is disposed below the second base station and configured to adjust a location of the second base station.

3. The apparatus of aligning and assembling of claim 2, wherein the differential adjustment unit comprises a first adjustment micrometer, a second adjustment micrometer and a third adjustment micrometer which are disposed below the second base station in sequence; wherein
    the second adjustment micrometer is configured to drive the second base station to move along a direction of X-axis;
    the third adjustment micrometer is configured to drive the second base station to move along a direction of Y-axis; and
    the first adjustment micrometer is configured to drive the second base station to move along a circumferential direction of Z-axis.

4. The apparatus of aligning and assembling of claim 2, wherein each of the second base station and the first base station is provided with a sliding chute and an alignment stopper; wherein
    the alignment stopper is movably disposed on the sliding chute and connected to a corresponding holding unit.

5. The apparatus of aligning and assembling of claim 2, wherein one side of the second base station is provided with a turnover limiting post configured to limit a location of the rotatable platform.

6. The apparatus of aligning and assembling of claim 1, wherein the turnover unit comprises a turnover frame disposed at one side of the adjustment platform, a top of the turnover frame is provided with a turnover shaft, and the turnover shaft is rotatably connected to one side of the rotatable platform, so that the rotatable platform is rotatable along a circumferential direction of the turnover shaft.

7. The apparatus of aligning and assembling of claim 1, wherein each of the first holding unit and the second holding unit comprises a vacuum adsorption platform.

8. The apparatus of aligning and assembling of claim 1, further comprising a base configured to carry both the adjustment platform and the turnover unit.

9. The apparatus of aligning and assembling of claim 8, wherein two sides of the base are each provided with a handle.

10. The apparatus of aligning and assembling of claim 1, wherein the first base station is provided with a turnover grip.

* * * * *